(12) United States Patent
Lopresti

(10) Patent No.: US 8,514,489 B2
(45) Date of Patent: Aug. 20, 2013

(54) SYSTEM FOR A POLAR POSITION OF A TELESCOPE

(75) Inventor: Claudio Lopresti, La Spezia (IT)

(73) Assignees: Claudio Lopresti, La Spezia (IT); Franco Bercella, Ramiola di Medesano (Parma) (IT)

( * ) Notice: Subject to any disclaimer, the term of this patent is extended or adjusted under 35 U.S.C. 154(b) by 555 days.

(21) Appl. No.: 12/740,251

(22) PCT Filed: Oct. 29, 2007

(86) PCT No.: PCT/IT2007/000750
§ 371 (c)(1),
(2), (4) Date: Jul. 12, 2010

(87) PCT Pub. No.: WO2009/057163
PCT Pub. Date: May 7, 2009

(65) Prior Publication Data
US 2010/0277795 A1    Nov. 4, 2010

(51) Int. Cl.
*G02B 23/16* (2006.01)
(52) U.S. Cl.
USPC .......................................................... 359/430
(58) Field of Classification Search
USPC .......................................... 359/399, 429, 430
See application file for complete search history.

(56) References Cited

U.S. PATENT DOCUMENTS

| 2,948,189 | A | 8/1960 | Fischer |
| 3,942,865 | A | 3/1976 | Rand |
| 4,400,066 | A | 8/1983 | Byers |
| 4,541,294 | A | 9/1985 | Byers |

OTHER PUBLICATIONS

"Equatorial (Polar) Alignment," Nov. 24, 2005, p. 1-5, URL: www.croydonastro.org.uk/Modified%20Meade%20Alignment%20Instructions%20D1.pdf.
Astro-Physics, Inc, "Polar Alignment Telescope," Feb. 9, 2006, p. 1-8, http://www.buytelescopes.com/manufacturers/astro_physics/pasill4.pdf.

*Primary Examiner* — Frank Font
(74) *Attorney, Agent, or Firm* — Dickstein Shapiro LLP

(57) ABSTRACT

A mount for a telescope, which allows precise polar of the telescope. The mount comprises: a base with a fixed portion and a pivoting portion; a first rocking structure, mounted to the base, which rotates by 90° on a plane perpendicular to the base; a second rocking structure, mounted to the first structure, which defines an axis AR and rotates by 180° about AR; a polar telescope, mounted to the second structure, with the optical axis aligned with AR; rotating joints, mounted to the second structure, defining an axis D incident and perpendicular to AR; a hose clamp, mounted to the rotating joints, and defining a housing for a telescope; a finder telescope, mounted to the rotating joints or clamp, with the optical axis $X_C$ being aligned with the housing defined by the clamp.

59 Claims, 7 Drawing Sheets

SYSTEM FOR A POLAR POSITION OF A TELESCOPE

FIELD OF THE INVENTION

The present invention relates to a system for the polar position of a telescope, particularly for amateur or semi-amateur portable telescopes, though it can be also applied to fixed telescopes and professional telescopes.

The invention comprises an equatorial mount, an astronomic observation system comprising the mount and a telescope and a method for carrying out the accurate polar position with this mount.

BACKGROUND ART

Within the field of astronomical observations, in order to observe celestial bodies of which the equatorial coordinates (Right Ascension and Declination) are known, the telescope polar axis requires to be aligned with the Earth polar axis. Thereby, the effect of the Earth's rotation can be cancelled about the polar axis, by means of an antagonist Right Ascension movement. Accordingly, a number of systems are known to achieve this polar position, both with motor-driven mounts and manually operated mounts.

These known systems, however, are not free of drawbacks, which are even more accentuate both in portable telescopes and telescopes that can be disassembled.

A drawback with many known systems is that, at the position time, they depend on the visibility of reference stars near the Celestial Pole (such as the North star in the Northern Hemisphere).

Another drawback of many known systems is that they are based on a reticle overlapped to the image provided by the polar eyepiece. This reticle allows to, after the parameters of date, time and place of observation have been set, properly orientate the telescope by simply matching several points that are marked on the reticle with the respective reference stars.

Since parameters depending on date, time and place of observation should be taken into account, a great level of skill and experience is required of the operator.

Furthermore, this system, which is potentially perfect on the telescope manufacturing date, introduces a small error which will however increase with the passing of years. The equinox precession, in fact, causes the reference stars to progressively move away from the positions marked on the eyepiece reticle. This movement, even though slow, introduces errors that can be appreciated 4-5 years after the telescope manufacture date.

A further drawback common to all known systems is that they strongly depend on the operator's skill, where by "skill" is meant his/her astronomic knowledge, operative ability and experience.

A further drawback depends on the fact that often the telescopes are not perfectly collimated and thus the proper position of the polar telescope does not determine the correct position of the main telescope as it is supposed to do.

A further drawback, typical of the so-called "Bigourdan's method" and the like, is that the position is carried out by successive approximations which are intended to gradually reduce the error. With these systems, obviously, the operator is required to reach a compromise between either speed or precision of the positioning procedure. Very demanding operators can even take several hours to achieve a satisfactory position, while a position of several tens of minutes will necessarily result to be inaccurate.

SUMMARY OF THE INVENTION

The object of the present invention is thus to provide a polar position system for telescopes, which at least partially overcomes the drawbacks of known position systems.

This object is achieved by means of a telescope mount in accordance with claim 1 and by a polar position method in accordance with claim 40.

Furthermore, a task of the present invention is to provide a polar position system for telescopes, which does not depend on the visibility of previously-identified reference stars.

A task of the present invention is to provide a polar position system for telescopes which is not affected by the effect of the equinox precession.

A task of the present invention is to provide a polar position system for telescopes, which potentially does not depend on the operator's skill, or depends thereon in a very marginal way.

A task of the present invention is to provide a polar position system for telescopes which affords a precise position in a relatively short time.

Each one of these tasks is achieved by a telescope mount and by a polar position method in accordance with one or more of the dependent claims.

Further features and advantages of the present invention will be better understood from the description of some exemplary embodiments, which is given below by way of non-limiting illustration.

DETAILED DESCRIPTION OF THE INVENTION

With reference to the annexed figures, with 1 has been generally designated a mount for a telescope 5 of a known type, while with 100 has been designated the astronomical observation device comprising the mount 1 and telescope 5.

The telescope 5, which is schematically shown as a cylinder, may be a refraction-type or the most common reflection-type. It may be, for example, a Newton, Dobson, Cassegrain, Schmidt-Cassegrain, catadioptric telescope, or derivates and variants thereof. This type of telescopes comprises a primary mirror, of which the diameter, focal length and optical configuration determine the luminosity and contrast of the image, and a more or less complicated optical system that conveys the image to an eyepiece, which will be responsible for the magnification thereof. As compared with refractor telescopes, reflection telescopes can be made with larger optics, while maintaining compactness and lightness; furthermore, they are much less expensive than refractor ones, at the same optical aperture, and thus are the ones which are commonly selected by amateur users; the system described herein can be however applied to all telescopes, either refractor or reflection ones.

Similar mounts to those illustrated herein are detailed in the two previous Patent Applications No. EP06425297.6 and PCT/IT2007/000330, by the same Applicant. A summary description will be now given of the mechanical mount according to the invention. For a more detailed description of the mount reference should be made to the previous applications.

The telescope 5 is supported the mount 1 proximate to the barycenter of the telescope.

Figure 1:
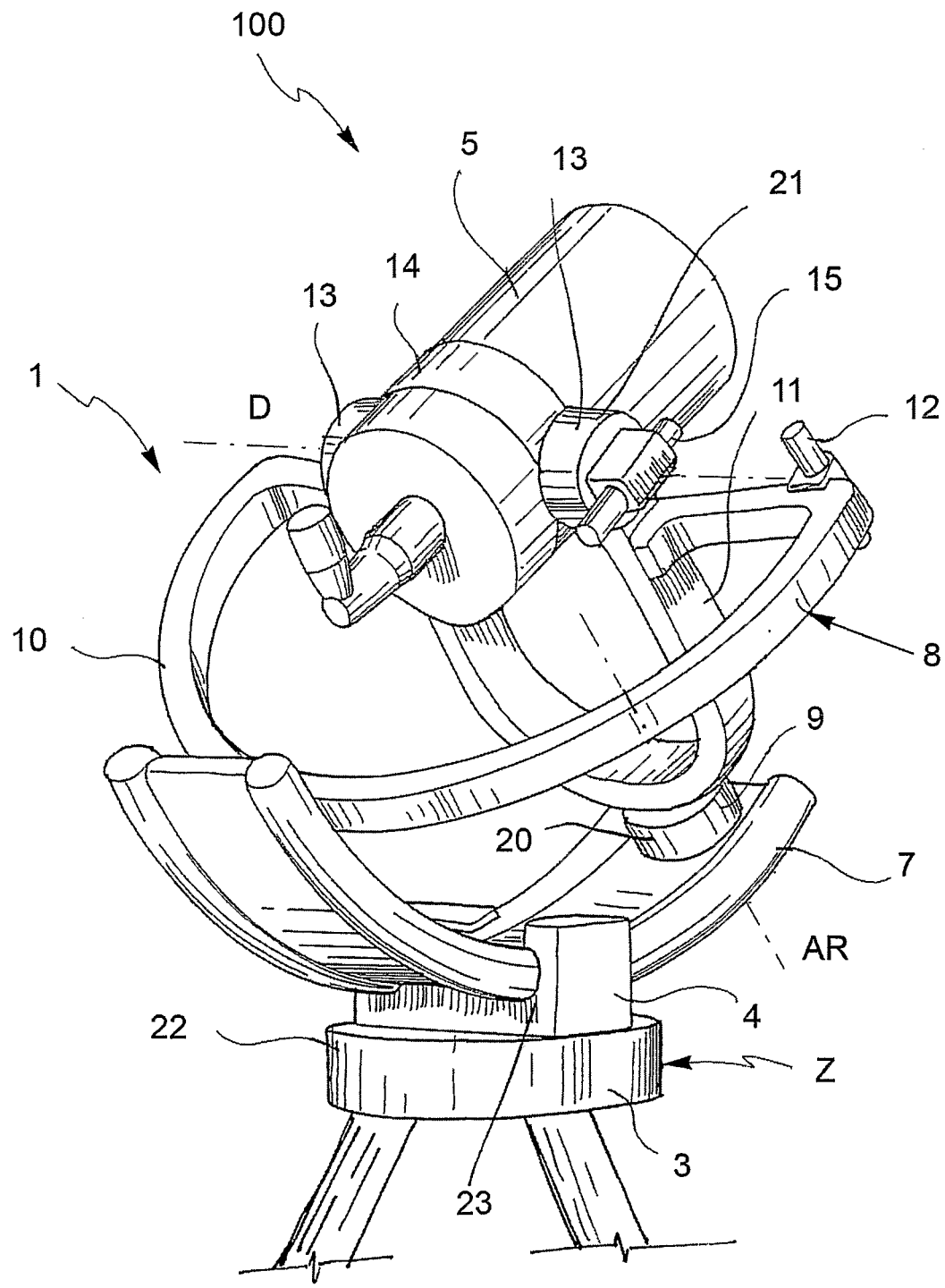
FIG. 1 is a perspective view of a mount according to the invention with a telescope being installed thereon.
Figure 2:
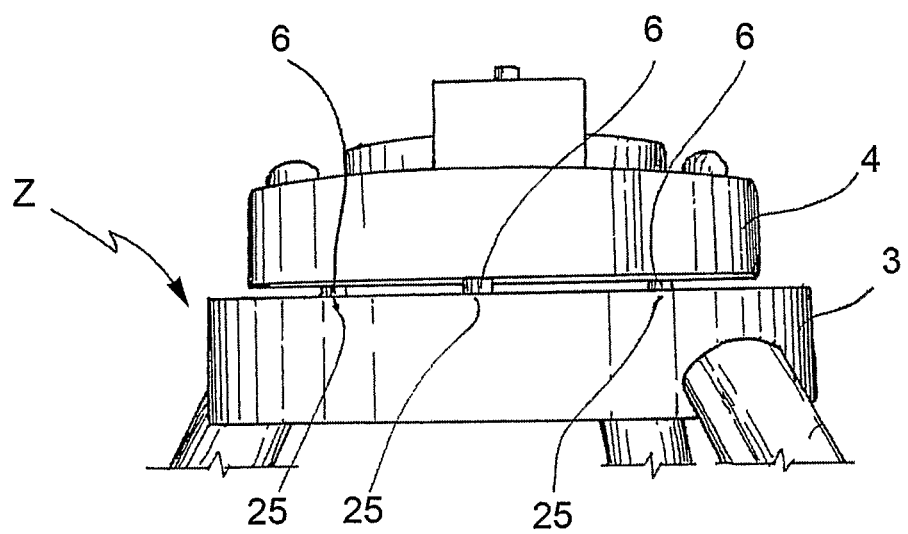
FIG. 2 is a detail of a mount similar to the one in FIG. 1.

With reference to the annexed FIG. 1, the mount 1 according to the invention comprises a base 2 suitable to ensure a firm support onto the ground. The base 2 comprises, in turn, a portion (called the fixed portion 3) suitable to be fixed relative to the ground, and a portion (called the pivoting portion 4) suitable to be rotated in a controlled manner relative to the fixed portion 3.

To the purpose of the proper position of telescope 5, the base 2 is intended to be leveled with the horizon. In accordance with an embodiment, the base 2 comprises leveling means 6 suitable to swing at least part of the base 2 relative to the horizon.

The leveling means 6 of base 2 can for example comprise three screws that are arranged about the base and spaced 120° away from each other.

In accordance with other possible embodiments, the leveling means 6 of base 2 can comprise a pair of elements arranged cross-like, each one being provided with a rocking side pin, and a screw producing the movement on the opposite side.

In the examples described above, by means of the screws, at least part of the base 2 can be orientated relative to the horizon as desired. As will be described below, the screws can be motor-driven or manually operated, as required.

On the pivoting portion 4 of the base 2, a first rocking structure is mounted, which will be called the primary arch 7, for clarity purposes.

The first rocking structure is preferably arc of circle-shaped, but may take different shapes. For example, in accordance with the embodiment of the mount illustrated in FIG. 7, the first rocking structure takes the shape of a rod hinged on the pivoting portion 4 of the base 2.

The primary arch 7 is mounted to the base 2 such as to be capable of performing an angular movement on a plane perpendicular to the base 2. The effective width of this angular movement is preferably higher than or equal to 90°.

To the purpose of proper position of the telescope 5, the rotating plane of the primary arch 7 is intended to be arranged along the local meridian and to rotate in order to allow setting the mount according to the latitude of the place of observation. This setting will be detailed below with reference to the polar axis of the mount.

On the primary arch 7 a second rocking structure 8 is mounted.

The second rocking structure 8 defines an axis AR (or Right Ascension Axis or Polar Axis) lying on the plane of the primary arch 7 and perpendicular to the primary arch 7 in the intersection point with the latter. The second rocking structure 8 is shaped such as to allow preforming an angular movement centered on the axis AR and lying on a plane perpendicular to this axis. The effective amplitude of this angular movement is preferably higher than or equal to 180°.

The second rocking structure 8 preferably comprises a pin 9, the axis thereof being coincident with the axis AR. In other words, the pin is mounted to the primary arch 7 such that the axis thereof lies on the plane of rotation of the primary arch 7 and is aligned with the radius of the primary arch 7. In other words, the axis AR defined by the pin 9 is perpendicular to the tangent of the primary arch 7 in the incidence point.

The second rocking structure 8 preferably comprises another arc-of-circle shaped element, which is called the secondary arch 10 herein below. The secondary arch 10 is mounted to the primary arch 7 such as to be capable of performing an angular movement centered on the axis AR and lying on a plane perpendicular to this axis. The effective amplitude of this angular movement is preferably higher than or equal to 180°.

To the pin 9, a connecting structure is preferably mounted, called the fork 11 herein below, which pivots about the axis AR and connects the pin 9 to the secondary arch 10.

The connecting structure 11 preferably takes the shaped of a fork, but may also take other shapes, such as having an individual arm.

The fork 11 and secondary arch 10 are preferably made of an individual monolithic structure. This solution allows achieving a higher precision and a greater total stiffness.

Figure 7:
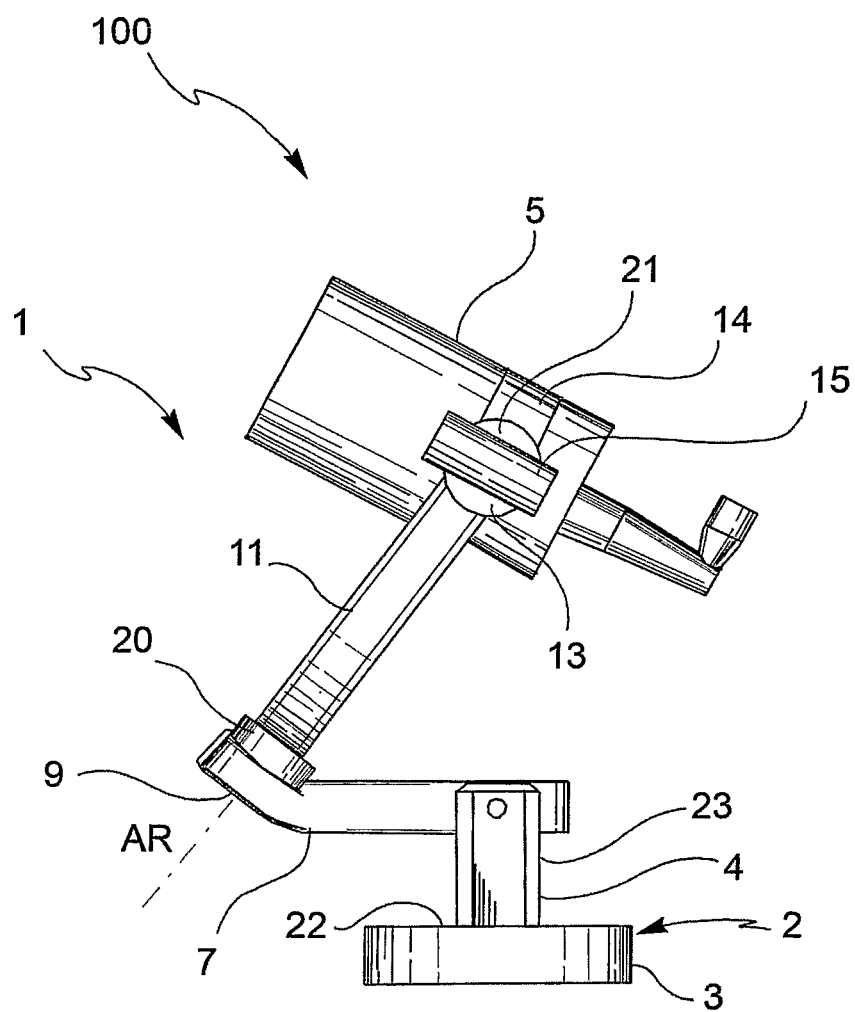
FIG. 7 is a side view of an alternative embodiment of the mount according to the invention, with a telescope being installed thereon.

In accordance with the embodiment in FIG. 7, the second rocking structure 8 comprises only the pin 9 (defining the axis AR) and the fork 11, whereas the secondary arch 10 is not provided.

This solution leads to an unbalanced structure, to which, however, all the procedures and movements described in the present invention can be effectively applied.

To the secondary arch 10 or fork 11, a polar telescope 12 is mounted. The polar telescope has the optical axis $X_P$ aligned with the axis AR.

On the secondary arch 10 or fork 11, rotating joints 13 are mounted, which define an axis D or axis of Declination. The rotating joints 13 are mounted such that the axis D meets the axis AR and is perpendicular thereto. The rotating joints 13 are preferably two, but only one may be provided in order to meet particular requirements.

To the rotating joints 13, a hose clamp 14 is mounted. With the term "hose clamp" is meant herein and below to designate means suitable to receive and support a telescope 5. These means, in order to meet particular requirement, can comprise elements other than the properly said clamp. In addition to the hose clamp, the means suitable to receive and support the telescope 5 can comprise, for example, brackets, vices, jaws and the like, which also may not wrap the telescope tube.

The hose clamp 14 defines a housing suitable to receive and support a telescope 5. The housing defined by the hose clamp 14 is preferably cylindrical in order to be capable of supporting the cylinder-shaped telescopes, but can take any other shape according to the particular requirements. Due to the rotating joints 13, the telescope 5 can rotate about the axis D.

The hose clamp 14, as well as the entire mount 1, is conceived to achieve a center of gravity suspension for the telescope 5. This suspension is particularly advantageous, in that it allows moving the telescope with a minimum effort in any orientation. Furthermore, this suspension is always balanced without requiring any ballast to be applied thereto.

On the rotating joints 13, a finder telescope 15 is further mounted, with the optical axis $X_C$ lying on a plane perpendicular to the axis of declination D. The optical axis $X_C$ is further aligned with the geometrical axis of the housing being defined by the hose clamp 14 and intended to receive the telescope 5.

All the above-said geometric relationships between the various components of the mount (parallelisms, perpendicularities, intersections, etc) are obtained with the highest possible precision during the mount manufacturing step.

Herein below, by the term "optical units" will be meant the assembly of main telescope 5, polar telescope 12 and finder telescope 15.

In accordance with an embodiment of the mount according to the invention, alignment correction means 16 are interposed between the rotating joints 13 and the hose clamp 14. The alignment correction means 16 are suitable to swing the whole optical tube of the telescope 5 such as to allow compensating any collimation errors that are inherent within the telescope. In other words, the alignment correction means 16 allow aligning the optical axis $X_T$ of the main telescope 5 with the optical axis $X_C$ of the finder telescope 15 and/or with the optical axis $X_P$ of the polar telescope 12, independently of the proper collimation of the main telescope 5.

These alignment correction means 16 result to be required when the main telescope 5 is not manufactured along with the mount 1, and/or when the optical parts thereof are misaligned relative to the geometric axis of the optical tube, and generally when the optics alignment quality thereof is unknown in advance.

Figure 3:
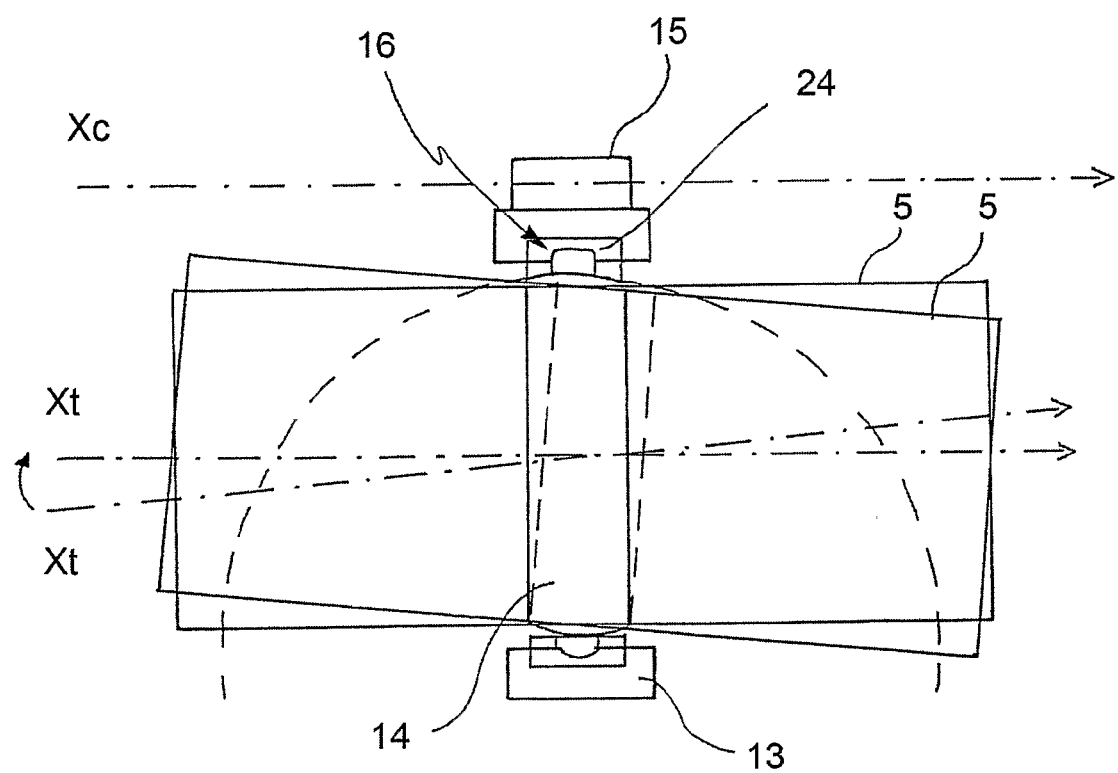
FIG. 3 is a detail of a mount according to the invention with a telescope being installed thereon.
Figure 4:
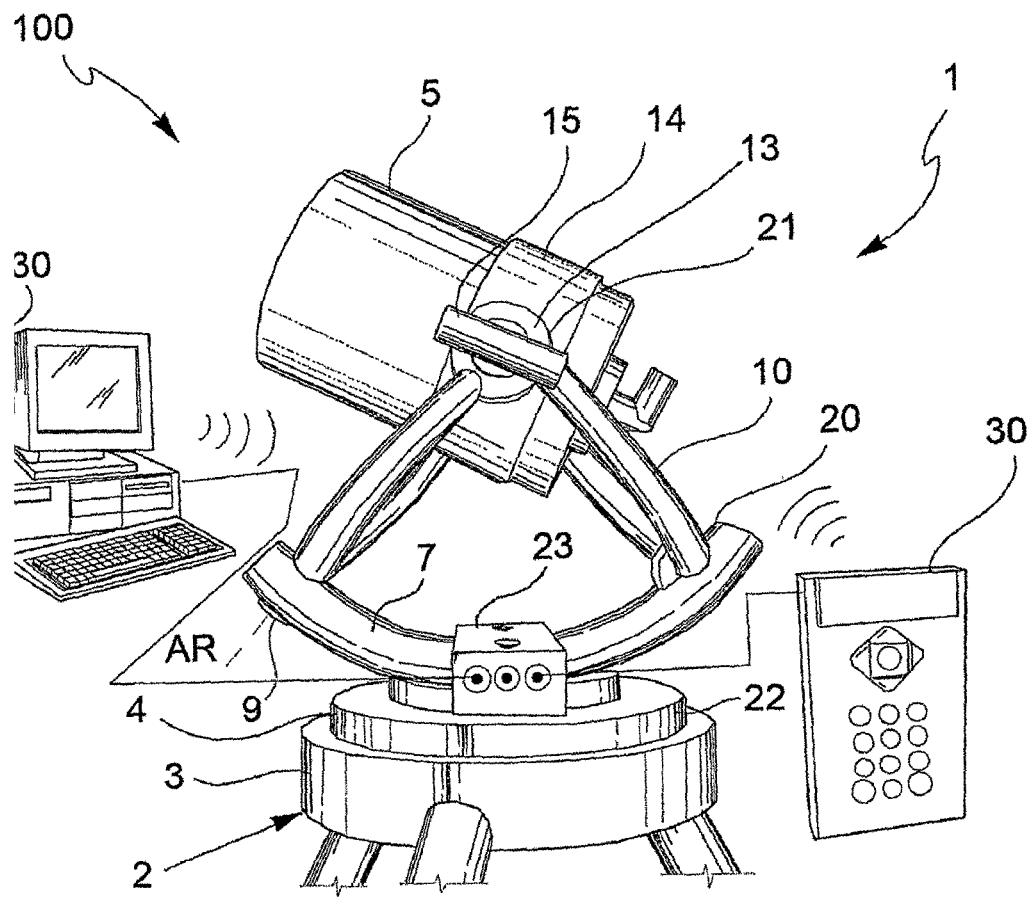
FIG. 4 schematically shows a mount according to the invention.

The telescope 5 may, in fact, be not collimated, i.e. the optical axis $X_T$ thereof may not be coincident with the geometric axis of the tube. FIG. 3 represents this error condition, together with the corrective effect of the means 16; the error extent is exaggerated for clarity purposes. As may be seen in FIG. 3, the alignment correction means 16 do not allow correcting any collimation error of the main telescope 5; for this correction, in fact, one should act on the optical components within the telescope. The alignment correction means 16, on the other hand, allow compensating any collimation error of the main telescope 5 such as to cancel the effect of the same.

All the elements of the mount according to the invention are addressed to the requirement of being capable of aligning the optical axis $X_P$ of the polar telescope 12, the optical axis $X_C$ of the finder telescope 15 and the optical axis $X_T$ of the main telescope 5 to a same optical target.

In accordance with an embodiment, the mount 1 comprises a motor (called the right ascension motor 20) which is suitable to cause the telescope 5 to rotate about the axis AR. The right ascension motor 20 is suitable to cause the telescope 5 to rotate through the second rocking structure 8, for example by acting on the pin 9 or secondary arch 10. The right ascension motor 20 is preferably of the step-by-step type and can be operated at different speeds. The highest speed allows the telescope 5 to be quickly pointed according to the equatorial coordinate of right ascension of a celestial body. Other possible speeds are the sidereal one, the solar one, and the moon one for tracking the stars, the sun, and the moon, respectively. Other speeds can be set as desired for particular contingent requirements or to track particular objects, which do not follow the standard movements described herein. The right ascension motor 20 is preferably operated by a processor that is capable of transmitting commands according to an astronomic database and/or according to the commands that are manually entered by the operator.

In accordance with an embodiment, the mount 1 comprises a motor (called the declination motor 21) that is suitable to rotate the telescope 5 about the axis D thereof. The declination motor 21 is positioned at the rotating joints. It is preferably of the step-by-step type and can be operated at different speeds. The highest speed allows the telescope 5 to be quickly pointed according to the equatorial coordinate of declination of a celestial body. Other possible speeds are those used in correcting the pointing during long photographic sittings and/or long trackings. The declination motor 21 is preferably operated by a processor that is capable of transmitting commands according to an astronomic database and/or according to the commands that are manually entered by the operator.

The right ascension 20 and declination 21 motors allow automatically pointing and tracking a celestial body provided the equatorial coordinates of the latter are known.

In accordance with an embodiment, the mount comprises a motor (called the azimuth motor 22) which is suitable to cause the pivoting portion 4 of the base 2 to rotate relative to the fixed portion 3. The azimuth motor 22 is preferably of the step-by-step type and can be operated at different speeds. The highest speed allows the telescope 5 to be quickly azimuth pointed based on the azimuth coordinate of a celestial body.

The azimuth motor 22 is preferably operated by a processor that is capable of transmitting commands according to an astronomic database, according to a GPS, according to an electronic compass, and/or according to the commands that are manually entered by the operator.

In accordance with an embodiment, the mount comprises a motor (called the altitude motor 23) which is suitable to cause the telescope 5 to rotate on the plane of the local meridian. The altitude motor 23 is suitable to cause the telescope 5 to rotate through the first rocking structure, for example by acting on the primary arch 7. The altitude motor 23 is preferably of the step-by-step type and can be operated at different speeds. The highest speed allows the telescope 5 to be quickly pointed according to the altitude coordinate of a celestial body.

The altitude motor 23 is preferably operated by a processor that is capable of transmitting commands according to an astronomic database, according to a GPS, and/or according to the commands that are manually entered by the operator.

The azimuth 22 and altitude 23 motors allow automatically pointing a celestial body provided the altazimuth coordinates are known.

In accordance with several automatic and non manual embodiments, the mount 1 comprises two motors (called the alignment motors 24) which are suitable to swing the hose clamp 14 on two planes perpendicular to each other. The alignment motors 24 act on the alignment correction means 16. The alignment motors 24 are preferably of the step-by-step type.

The alignment motors 24 are preferably operated by a processor that is capable of transmitting commands based on the comparison between which is centered in the visual field of the finder telescope 15 and what is centered in the visual field of the main telescope 5.

In accordance with an embodiment, the mount comprises motors (called the leveling motors 25) which are suitable to swing at least part of the base 2 and primary arch 7 integral therewith, relative to the horizon. The leveling motors 25 act on the leveling means 6 of the base 2 and are preferably of the step-by-step type.

The leveling motors 25 are preferably operated by a processor that is capable of transmitting commands according to the data supplied by a base leveling detection system, such as an electronic level.

In accordance with an embodiment of the invention, the mount 1 comprises an electronic apparatus 30, which is suitable to control at least part of the functions of the mount 1.

The electronic apparatus 30 can be a commercially available apparatus on which a software suitable for managing the mount has been loaded. The electronic apparatus 30 can be, for example, a personal computer, a pocket pc, a palmtop, a smart phone, or any other suitable data-processing system that produces an output signal.

Alternatively, the electronic apparatus 30 can be an apparatus that is especially dedicated to this function, such as a circuit board with a dedicated keyboard. In any case, the electronic apparatus should be suitably interfaced with the mount 1 and/or optics 5, 12, 15 of the telescope. Information can be exchanged between the electronic apparatus 30 and mount 1 and/or optics 5, 12, 15 of the telescope by cable, according to a wireless mode, or according to any other mode suitable for transmitting and receiving signals.

In accordance with an embodiment, the electronic apparatus 30 is suitable to control at least part of the motors of the mount 1. The electronic apparatus 30 is thus suitable to control the movements of the motors. These movements can be controlled according to a explicit command by the operator or according to calculations and comparisons with desired positions. To the purpose, it should be noted that the electronic apparatus is capable of detecting the actual position of an individual motor or the mount parts that are moved by this motor. This detection can be carried out, for example, by means of suitable encoders, known per se.

The electronic apparatus 30 is preferably capable of acquiring data from localization equipment (GPS, electronic compass, electronic level, and the like) and of managing an astronomic database.

The electronic apparatus 30 is preferably capable of connecting to other electronic apparatus in order to exchange data and/or increase the overall potentialities of the system.

In accordance with an embodiment, the electronic apparatus 30 is further capable of comparing, with an astronomic database, the images acquired from suitable sensors that are placed in the eyepieces of the optics of the main telescope 5, and/or polar telescope 12, and/or finder 15. Thereby, the electronic apparatus is capable of automatically identifying the celestial bodies being framed.

Figure 5:
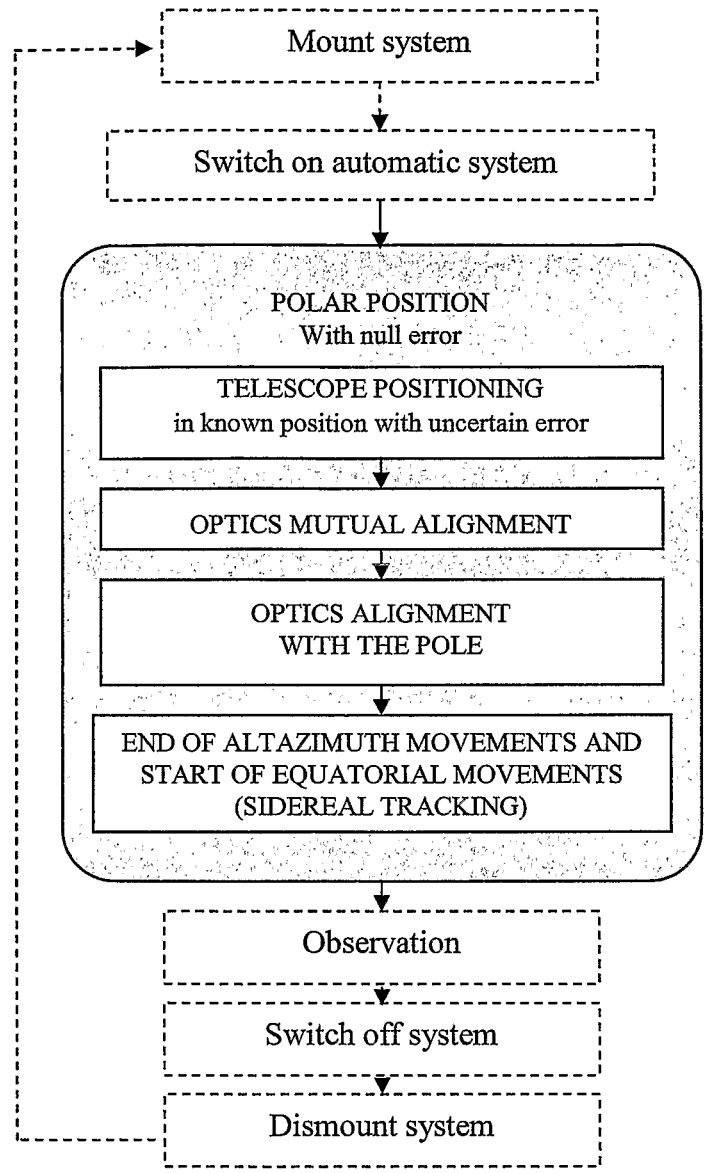
FIG. 5 shows a method according to the invention by means of a flow diagram.

In accordance with the broadest embodiment (outlined in the diagram in FIG. 5), the method according to the invention for the polar position of the telescope provides the following stages:
- positioning the telescope in a known starting position with an uncertain though limited margin of error;
- mutually aligning the three optical units (polar telescope 12, finder telescope 15 and main telescope 5);
- aligning the polar axis of the telescope with the polar axis of the earth, with only the altazimuth movements of the mount 1; and
- disabling the altazimuth movements and starting the sidereal movement in equatorial movement.

Without departing from the scope of the present invention, the sequence of the above-stated first two stages of the method can be reversed.

In accordance with an embodiment of the method, the stage of positioning with uncertain though limited error first comprises the rough leveling of base 2.

In accordance with an embodiment of the method, the step of positioning with uncertain though limited error further comprises positioning the second rocking structure 8 in a known position. From this known position, the system may start counting the angular amplitude of the movements imposed by the motors. For example, the second rocking structure 8 can be arranged such that the declination axis D is parallel to the plane of the base 2. To facilitate this positioning, suitable references are advantageously applied in the factory during manufacture. This operation positions the axis D such as to be roughly parallel to the horizon, since the base 2 is roughly leveled.

In order to meet particular requirements, a different selection of the axis D can be also effective, such as perpendicular to the plane of base 2.

In accordance with an embodiment of the method, the mutual alignment stage of the optical units provides for the alignment of the finder telescope 15 with the polar telescope 12 trough the rotation about the declination axis D. Subsequently, the main telescope 5, when it has not yet aligned, can be aligned either with the polar telescope 12 or finder telescope 15 by means of the movement of the alignment correction means 16.

In still greater detail, the mutual alignment is carried out by sequentially framing the same point-like object in the center of the eyepiece of each of the three optical units. This object may be a star or preferably a terrestrial object that is sufficiently far away (a few kilometers). Pointing a terrestrial object results to be the preferred option, in that it determines a more precise alignment irrespectively of the time taken to achieve the same. When a star is pointed, on the contrary, a sidereal motion takes place which is proportional to the time taken for performing the alignment operations. This sidereal motion cannot be properly cancelled by the right ascension motion, because the mount 1 has not yet achieved the proper position thereof.

When the mount is in a known position and the three optical units 12, 15, 5 are pointed to the same direction and thus are mutually aligned, the system is "reset". By "resetting" is meant herein that the angular pointing differences (in Right Ascension and Declination) of the finder telescope 15 and main telescope 5 are set to zero relative to the polar telescope 12. From this resetting, the system starts counting the angular amplitudes of the movements.

In accordance with an embodiment of the method, the stage of aligning the telescope polar axis with the earth polar axis provides that, by means of only the altazimuth movements of the mount 1, the polar telescope 12 is roughly aligned with the celestial pole. This rough alignment can be carried out according to the latitude and local meridian direction, which are obtained from topographic surveys and/or by means of a GPS, or the like.

The pointing of the polar telescope 12 determines the simultaneous pointing of the other two optical units 15 and 5. In fact, during this operation, the finder telescope 15 and main telescope 5 are not moved relative to the polar telescope 12 and thus maintain the resetting that has been previously carried out. The rough pointing to celestial pole is affected by the errors that have been carried out while leveling the base 2, while determining the latitude and when determining the local meridian direction.

When the three optical units 12, 15 and 5 are roughly pointed to the celestial pole, the altazimuth motors are switched off, and the equatorial tracking motor 20 is switched on.

At this stage, the telescope is commanded to move, starting from the reset condition as described above, with equatorial movements towards a visible reference star with known equatorial coordinates. As the pointing to the celestial pole is affected by the errors described above, the reference star will not be pointed accurately.

At this stage, the operator acts such as to perfectly frame the star in the center of the eyepiece of the main telescope, by only the altazimuth movements, i.e. without any further action on the equatorial movements.

Due to these altazimuth movements, the polar axis (or axis AR) of the mount 1 comes to be set parallel to the earth polar axis. What was sought has been achieved, and this is called the "polar position".

Now that the polar axis is correctly positioned, the unification of both coordinate systems (altazimuth and equatorial) has been obtained, and the system does not require to be reset any longer.

Now one can start counting any sequential angle of movement of the right ascension 20 and declination 21 equatorial motors. The polar position is carried out with null geometric error.

Referring back to FIG. 5, the diagram parts depicted in dotted lines relate to stages that are not parts of the method according to the invention.

It should be noted that, unlike known systems, the system according to the invention allows obtaining the correct polar position even in those conditions in which the celestial pole is not visible due to weather conditions and/or obstacles. The stages of the method as described above, in fact, can be brought to an end with reference to any visible star.

The stage of mutual alignment of the three optical units does not even require to know the reference star.

For the telescope rough positioning stage, it is sufficient to approximatively know the latitude and direction of the local meridian by means of topographic survey or by means of GPS. Alternatively, and more simply, the operator's skill can be sufficient, who is required to roughly identify the North-South direction (defining the meridian) and to approximatively know the degree value of the latitude of the place of observation.

Based on these data, which are affected by an unknown though limited error, it is possible to do a first rough polar position and reset the system.

After any visible and known star has been identified, a "virtual" automatic pointing to the star can be carried out by the equatorial movements of the mount. The pointing is called "virtual" because it will be affected by an error, the same error of the polar position. However, since this error is limited, the reference star will be framed within the visible field of the finder telescope 15, or at the worst it will be still however comprised within that area in the sky where the telescope is pointed.

By centering the finder telescope 15 and main telescope 5 to the reference star only by the altazimuth movements of the mount, the exact polar position is obtained for the mount. At the end, the altazimuth movements should be disabled, as usual, and the automatic tracking should be carried out in the equatorial mode.

As seen above, the system according to the invention allows obtaining the exact polar position even though the celestial pole is not visible, provided the latitude and North-South direction are known, even in an approximate manner. An isolated, luminous and easily identified star is preferred as the reference star; luminous clusters of stars should be avoided, as they may deceive the unskilled observer.

In accordance with another embodiment of the method according to the invention, the stage of positioning the telescope preferably comprises several steps:

Leveling the base 2 (such as by means of a level).
Acquiring position data (such as by means of GPS or topographic surveys).

In accordance with another embodiment of the method according to the invention, the stage of mutually aligning the three optical units preferably comprises several steps:

Pointing a reference star with the polar telescope 12.
Aligning the finder telescope 15 and main telescope 5 with the reference star.

In accordance with another embodiment of the method according to the invention, the stage of alignment with the celestial pole preferably comprises several steps:

Identification of the reference star (such as based on a sky map or astronomic database).
Aligning the plane of rotation of the primary arch 7 with the plane of the local meridian, based on the azimuth of the reference star.
Aligning the axis AR with the pole, based on the altitude of the reference star.

After the subsequent stage of disabling the altazimuth movements and starting of the equatorial movement at sidereal speed, the precise polar position can be considered as achieved.

It should be noted that, according to the type of equipment being comprised within the telescope and mount 1, the actions required to the operator can be reduced to a minimum.

As described above, in accordance with one of the embodiments thereof, the mount 1 according to the invention is completely motor-driven, provided with a level, provided with GPS and with a compass. Furthermore, in accordance with an embodiment, at least one of the telescope optics comprises a digital sensor (video camera, webcam, ccd sensor, electronic eyepiece, or the like), which is operatively connected to a software that is capable of displaying and/or identifying the portion of sky being framed.

In accordance with an embodiment, the digital sensor is capable of supplying a software with the collected data for the latter to be compared with suitable astronomic databases (or virtual planetariums) such as to be capable of identifying and recognizing any celestial body that is framed. Such equipment is capable of bringing the above-described polar position to an end in a fully automatic manner.

Simpler embodiments will obviously require more frequent and more conscious actions by the operator.

Figure 6:
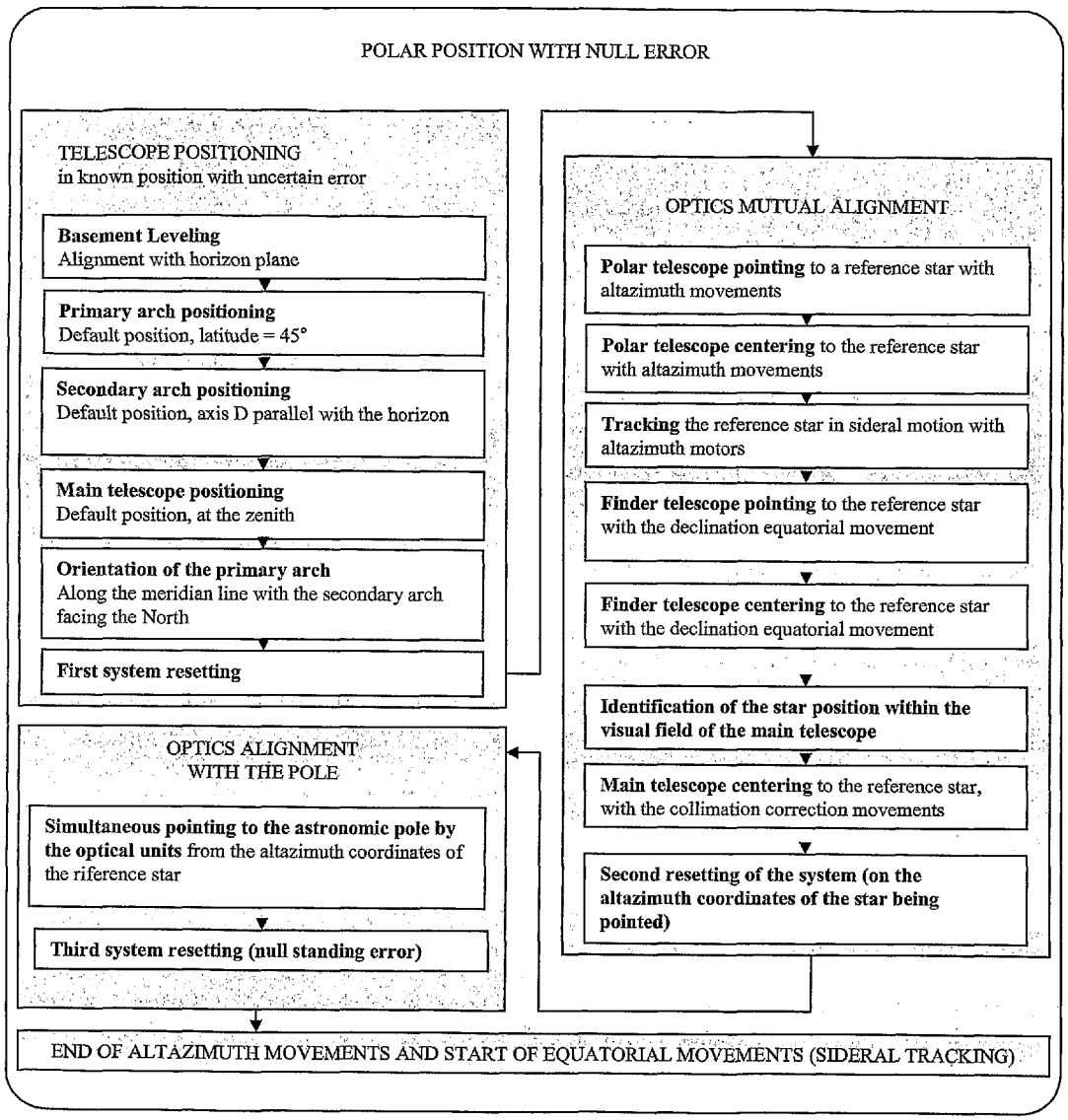
FIG. 6 shows an embodiment of the method according to the invention by means of a flow diagram.

In accordance with another embodiment of the method according to the invention (outlined in the diagram in FIG. 6), the stage of positioning the telescope in a known starting position preferably comprises several steps:

Leveling the base 2 with the horizon plane. This leveling can be obtained, according to the type of mount being used, by means of a (either analogue or digital) level and by means of actuators, either motor-driven or manually operated.
Positioning the primary arch 7 in a known position, such as with the axis AR inclined at 45°.
Positioning the secondary arch 10 in a known position, such as with the axis D parallel to the horizon.
Positioning the main telescope 5 in a known position, such as pointed to the zenith.
Positioning the primary arch 7 along the local meridian with the secondary arch 10 facing the Pole.

The above-described positionings can be carried out, according to the type of mount being used, either with motor-driven or manual movements and with analogue or digital references.

At the end of the positioning stage, a first resetting is obtained. The telescope is in a known position, with uncertain error. In other words: the base 2 will be roughly leveled relative to the horizon, the primary arch 7 will be roughly orientated along the local meridian, the main telescope 5 will be roughly pointed to the zenith, and so on.

In accordance with a further embodiment of the method according to the invention, the stage of mutually aligning the three optical units preferably comprises several steps:

Roughly pointing the polar telescope 12 to a known and visible reference star using only the altazimuth movements of the mount 1.

Centering (fine pointing) the reference star within the visual field of the polar telescope 12, again using only the altazimuth movements of the mount 1.

Tracking the reference star in the sidereal movement using only the altazimuth movements of the mount 1.

Roughly pointing the finder telescope 15 on the reference star, previously centered by the polar telescope 12, using only the declination movement.

Centering (fine pointing) the reference star within the visual field of the finder telescope 15 using only the declination movement.

Detecting the reference star within the visual field of the main telescope 5.

Centering (fine pointing) the reference star within the visual field of the main telescope 5, by means of the movement of the alignment correction means 16 (optical alignment).

The above-described stages can be carried out, according to the type of mount being used, either with motor-driven or manual movements and with analogue or digital references.

At the end of the mutual alignment stage of the three optical units, a second resetting is achieved on the altazimuth coordinates of the reference star. The telescope is in a known position, with null error and with the optical units aligned with each other. Particularly, the altazimuth and equatorial coordinates of the reference star are known.

The subsequent stage is that of alignment with the celestial pole, with only the altazimuth movements of the mount 1, of the three optical units. As the hour angle (azimuth) and altitude of the reference star are known, it is possible to command the altazimuth motors to direct to the pole.

The above-described stage can be carried out, according to the type of mount being used, either with motor-driven or manual movements and with analogue or digital references.

At the end of the stage of aligning the three optical units to the celestial pole, a third and last resetting is achieved. The telescope is pointed to the Pole, with null error and with the optical units being aligned with each other.

After the subsequent stage of disabling the altazimuth movements (by locking the respective movable parts and/or by disabling the respective motors) and starting the equatorial movement at the sidereal speed by means of the right ascension motor 20, it may be considered that the precise polar position has been achieved.

From this configuration of the telescope, the system is in the work conditions, and the observations of the celestial bodies, the pointings based on the equatorial coordinates and the automatic trackings can be started.

The method described herein, comprising the stages of rough positioning of the telescope, mutual alignment of the three optical units, alignment with the celestial pole and start of the automatic tracking and the respective steps of each stage, can require from a few minutes (in the event of many movements to be manually carried out) to a few seconds (in the event that all movements are motor-driven and electronically controlled).

The telescope positioning stage has been described above in a known starting position with an uncertain though limited margin of error. This positioning is carried out by means of some equipment (GPS, levels, compasses, etc.), which are generally affected by errors of various origin and not known in advance. The average quality of the equipment available on the market, however, ensures that the positioning errors do not exceed 2°+3°, even when they are summed to each other. It is important to notice herein that 2°+3° (and even greater) error is however comprised within the visual field of the optics. This ensures that the subsequent pointing of the reference star, though rough, allows having this star within the visual field, in any case. Since the subsequent stages of the polar position method do not depend on the equipment any longer, but are carried out with reference only to the sky, the method leads to an exact result and is not affected by the equipment errors.

Other errors can be introduced during the movements by motors, draggings, possible clearances, etc. The extent of these errors can increase proportionally with the extent of the displacements. For this reason, during the polar position procedure, when possible, it is always recommended to use a star as close as possible to the celestial Pole as the reference star. In any case, it should be also noted that with step-by-step motors, and preferably with encoders that are not fixed to the motor but as downstream as possible to the kinematic chain providing the movement thereof, these errors can be restrained within a few hundreds of degree. Such an error of this extent does not impair the functionality of the system.

The mount 1, the observation device 100 and the polar position method according to the invention have been described referring to several particular embodiments to which a number of modifications can be brought without departing from the scope of the invention.

For example, the first rocking structure may also not be arc-of-circle shaped, but for example be shaped as shown in FIG. 7. In this case, the rocking effect will take place when the structure is rotated about the fulcrum thereof. As compared with the solution comprising the primary arch, this solution can result to be generally less balanced.

A similar solution may be obviously also applied to the second rocking structure 8, independently of how it is shaped. Still with reference to FIG. 7, it may be noticed how the second rocking structure 8 comprises only the pin 9 and cantilever-mounted fork 11.

In these solutions, the ability of the altitude 23 and right ascension 20 motors to hold the structure stopped after the latter has been positioned results to be particularly critic for the mount operation. For this reason, suitable mechanic locking systems will be also preferably used.

For example, the rotating joints 13 may not be arranged on both sides of the hose clamp as in the annexed figures; an individual joint 13 may be provided, which is placed only on one side of the hose clamp. As compared with the solution using two joints, this solution may result more comfortable due to the greater accessibility to the eyepiece, but it will be generally less balanced.

It should be understood that only several particular embodiments of the mount 1 and polar position system according to the invention have been described, to which those skilled in the art will be capable of making any modifications as required for adapting the same to particular applications, without however departing form the scope of the invention as defined in the following claims.

The invention claimed is:

1. A mount for a telescope comprising:
   a base for supporting the mount onto the ground, comprising a portion fixed relative to the ground and a portion pivoting relative to the fixed portion;
   a first rocking structure, mounted to the pivoting portion of the base, for performing an angular movement greater than or equal to 90°, in a plane perpendicular to the base;
   a second rocking structure, mounted to the first rocking structure, defining an axis of rotation AR for performing an angular movement greater than or equal to 180°, about the axis AR;

a polar telescope, mounted to the second rocking structure, having an optical axis that is aligned parallel to the axis AR;

rotating joints, mounted to the second rocking structure, defining an axis D that is incident and perpendicular to the axis AR;

a hose clamp, mounted to the rotating joints, and defining a housing for receiving and supporting a telescope;

a finder telescope, mounted to the rotating joints, with an optical axis $X_c$ thereof lying on a plane perpendicular to the axis D and aligned to a geometric axis of the housing defined by the hose clamp.

2. The mount for a telescope according to claim 1, wherein the base comprises leveling means for causing at least part of the base and the first rocking structure integral therewith to swing relative to the horizon.

3. The mount for a telescope according to claim 1, wherein the leveling means of the base comprise three screws arranged about the base and 120° spaced away from each other.

4. The mount for a telescope according to claim 1, wherein the first rocking structure, or primary arch, comprises an arc-of-circle shape.

5. The mount for a telescope according to claim 1, wherein the first rocking structure, has the shape of a rod hinged on the pivoting portion of the base.

6. The mount for a telescope according to claim 1, wherein the second rocking structure comprises a pivot with the axis thereof being coincident with the axis AR.

7. The mount for a telescope according to claim 6, wherein the pivot is mounted to the primary arch such that the axis thereof is comprised on the plane of rotation of the primary arch and is aligned with the radius of the primary arch.

8. The mount for a telescope according to claim 1, wherein the second rocking structure comprises an arc-of-circle element, or secondary arch.

9. The mount for a telescope according to claim 6, wherein a fork is mounted to the pin, which is pivoting about the axis AR.

10. The mount for a telescope according to claim 1, wherein the fork connects the pin to the secondary arch.

11. The mount for a telescope according to claim 9, wherein the fork and secondary arch are made in an individual monolithic structure.

12. The mount for a telescope according to claim 1, wherein the geometrical relationships of the various components of the mount are obtained with the highest possible precision during the manufacturing stage of the mount.

13. The mount for a telescope according to claim 1, wherein between the rotating joints and the hose clamp, are interposed alignment correction means for swinging the optical tube of the telescope such as to allow the compensation of any collimation errors of the telescope.

14. The mount for a telescope according to claim 1, wherein the alignment correction means aligns the optical axis $X_\tau$ of the main telescope with the optical axis $X_c$ of the finder telescope.

15. The mount for a telescope according to claim 1, wherein all the mount elements align the optical axis $X_p$ of the polar telescope, the optical axis $X_c$ of the finder telescope and the optical axis $X_\tau$ of the main telescope with each other, towards a same optical target.

16. The mount for a telescope according to claim 1, wherein the mount comprises a right ascension motor for causing the telescope to rotate about the axis AR.

17. The mount for a telescope according to claim 1, wherein the right ascension motor causes the telescope to rotate through the second rocking structure.

18. The mount for a telescope according to claim 1, wherein the mount comprises a declination motor for causing the telescope to rotate about the axis D.

19. The mount for a telescope according to claim 1, wherein the declination motor is positioned at the rotating joints.

20. The mount for a telescope according to claim 1, wherein the mount comprises an azimuth motor for causing the pivoting portion of the base to rotate relative to the fixed portion of the base.

21. The mount for a telescope according to claim 1, wherein the mount comprises a altitude motor for causing the telescope to rotate on the plane of the local meridian.

22. The mount for a telescope according to claim 1, wherein the altitude motor causes the telescope to rotate through the first rocking structure.

23. The mount for a telescope according to claim 1, wherein the mount comprises two alignment motors for swinging the hose clamp in two planes that are perpendicular to each other.

24. The mount for a telescope according to claim 1, wherein the alignment motors act on the alignment correction means.

25. The mount for a telescope according to claim 1, wherein the mount comprises leveling motors which swing at least part of the base and the primary arch that is integral therewith relative to the horizon.

26. The mount for a telescope according to claim 16, wherein at least one of said motors is of the step-by-step type and can be operated at different speeds.

27. The mount for a telescope according to claim 1, wherein the mount comprises an electronic apparatus, for at least partially controlling the functionalities of the mount.

28. The mount for a telescope according to claim 27, wherein the electronic apparatus is a commercially available apparatus in which a software for controlling the mount has been loaded.

29. The mount for a telescope according to claim 27, wherein the electronic apparatus is an apparatus that is especially dedicated control the functionalities of the mount.

30. The mount for a telescope according to claim 27, wherein information is exchanged between the electronic apparatus and mount and/or telescope optics by cable, according to a wireless mode, or according to any other mode for transmitting and receiving signals.

31. The mount for a telescope according to claim 27, wherein the electronic apparatus detects, by means of suitable encoders, the actual position of an individual motor or parts of mount that are driven by this motor.

32. The mount for a telescope according to claim 1, wherein the electronic apparatus connects to other electronic apparatuses in order to exchange data.

33. The mount for a telescope according to claim 1, wherein the eyepieces of the polar telescope and/or finder telescope comprise sensors for acquiring the images being framed and transmit them to the electronic apparatus.

34. The mount for a telescope according to claim 1, wherein the declination motor is controlled by the electronic apparatus based on the comparison between what is centered within the visual field of the polar telescope and what is centered within the visual field of the finder telescope.

35. The mount for a telescope according to claim 1, wherein at least one of said motors is controlled by the electronic apparatus according to an astronomic database, a GPS, an electronic compass, an electronic level and/or according to the commands that are manually entered by the operator.

36. An astronomic observation device comprising a main telescope and a mount in accordance with claim 1.

37. The device according to claim 1, wherein the telescope is supported by the mount proximate to the barycenter of the telescope.

38. The device according to claim 36, wherein said main telescope comprises an eyepiece comprising a digital sensor for acquiring the image being framed and transmit the latter to the electronic apparatus of the mount.

39. The device according to claim 38, wherein the alignment motor is controlled by the electronic apparatus according to the comparison between what is centered within the visual field of the finder telescope and what is centered within the visual field of the main telescope.

40. A method for the precise polar position of an astronomical observation device in accordance with claim 36, said method comprising the stages of: positioning the telescope in a known starting position, with an uncertain though limited margin of error; mutually aligning the three optical units; and aligning the celestial pole, with only the altazimuth movements of the mount, of the three optical units; disabling the altazimuth movements and starting the equatorial movements.

41. The method according to claim 40, wherein the stage of positioning with uncertain though limited error comprises: the at least rough leveling of the base; and the positioning of the second rocking structure in a known position.

42. The method according to claim 40, wherein the stage of mutually aligning the optical units provides: aligning the finder telescope with the polar telescope through the rotation about a declination axis D; aligning the main telescope with the polar telescope or finder telescope, by means of the movement of the alignment correction means.

43. The method according to claim 40, wherein the stage of mutually aligning the optical units is carried out by sequentially framing the same object in the center of the eyepiece of each of the three optical units.

44. The method according to claim 43, wherein the point-like object is an isolated star or a terrestrial object a few kilometers away.

45. The method according to claim 40, wherein after the stage of mutually aligning the optical units follows the resetting of the pointing angular differences in Right Ascension and Declination of the finder telescope and main telescope relative to the polar telescope.

46. The method according to claim 40, wherein the stage of aligning the polar axis of the device with the polar axis of the earth comprises: roughly aligning the polar telescope with the celestial pole with only the altazimuth movements of the mount; roughly pointing the finder telescope and main telescope integral with the polar telescope to the celestial pole; disabling the altazimuth movements and switching on the right ascension motor at a sidereal tracking speed; roughly pointing the telescope to a visible reference star with known equatorial coordinates, with only the equatorial movements; finely framing the reference star in the center of the eyepiece of the main telescope with only the altazimuth movements.

47. The method according to claim 46, wherein the rough alignment of the polar telescope with the celestial pole is carried out according to the latitude and direction of the local meridian that are obtained by means of topographic surveys and/or by means of a GPS and/or by means of the observer's skill.

48. The method according to claim 40, wherein the stage of aligning the three optical units with the celestial pole comprises: identifying the reference star based on a sky map or astronomic database aligning the plane of rotation of the primary arch with the plane of the local meridian, according to the azimuth of the reference star; aligning the axis AR with the pole, according to the altitude of the reference star.

49. The method according to claim 40, wherein the stage of positioning the telescope in a known starting position comprises:
leveling the base with the horizon plane by means of an analogue or digital level; positioning the primary arch in a known position;
positioning the secondary arch in a known position;
positioning the main telescope in a known position;
positioning the primary arch along the local meridian with the secondary arch facing North.

50. The method according to claim 49, wherein the positioning of the primary arch comprises the positioning of the axis AR inclined at 45°; the positioning of the secondary arch comprises the positioning of the axis D parallel to the horizon; the positioning of the main telescope comprises the pointing of the main telescope towards the zenith.

51. The method according to claim 49, wherein after the stage of positioning the telescope in a known starting position follows a first resetting.

52. The method according to claim 40, wherein the stage of mutually aligning the optical units comprises:
roughly pointing the polar telescope to a known and visible reference star using only the altazimuth movements of the mount;
centering the reference star within the visual field of the polar telescope, again using only the altazimuth movements of the mount;
tracking the reference star in the sidereal movement using only the altazimuth movements of the mount;
roughly pointing the finder telescope to the reference star, previously centered by the polar telescope, using only the declination movement;
centering (fine pointing) the reference star within the visual field of the finder telescope using only the declination movement;
detecting the reference star within the visual field of the main telescope;
centering (fine pointing) the reference star within the visual field of the main telescope, by means of the movement of the alignment correction means.

53. The method according to claim 52, wherein a second resetting follows the stage of mutually aligning the three optical units.

54. The method according to claim 40, wherein the stage of aligning the three optical units with the celestial pole comprises the altitude and azimuth movement of the mount according to the altazimuth coordinates of the reference star.

55. The method according to the claim 54, wherein a third resetting follows the stage of aligning the three optical units with the celestial pole.

56. The method according to claim 40, wherein the stage of disabling the altazimuth movements and starting the equatorial movements comprises switching on the right ascension motor at sidereal speed.

57. The method according to claim 40, wherein the stages of the method are carried out with motor-driven or manual movements.

58. The method according to claim 40, wherein the stages of the method are carried out with analog or digital references.

59. The method according to claim 40, wherein the stages of the method are carried out in a completely automatic manner.

\* \* \* \* \*

UNITED STATES PATENT AND TRADEMARK OFFICE
CERTIFICATE OF CORRECTION

PATENT NO.       : 8,514,489 B2
APPLICATION NO. : 12/740251
DATED            : August 20, 2013
INVENTOR(S)      : Claudio Lopresti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Fifteenth Day of September, 2015

Michelle K. Lee
*Director of the United States Patent and Trademark Office*